Patented Nov. 25, 1941

2,264,025

UNITED STATES PATENT OFFICE 2,264,025

MANUFACTURE OF 1-CYANOBUTADIENE-1:3

Herbert Gudgeon and Rowland Hill, Blackley, Manchester, England, assignors to Imperial Chemical Industries Limited, a corporation of Great Britain No Drawing. Application April 12, 1939, Serial No. 267,490. In Great Britain April 13, 1938

10 Claims. (Cl. 260—464)

This invention relates to the manufacture of 1-cyanobutadiene-1:3.

This invention has as an object to devise a new method of manufacturing 1-cyanobutadiene-1:3. Further objects will appear hereinafter. These objects are accomplished by the following invention.

We have found that we can manufacture 1-cyanobutadiene-1,3 by heating carboxylic acid esters of acetaldolcyanohydrin, as further defined below, in gaseous or vapour form at a temperature at which they decompose.

The esters are di-esters, and the acids are aliphatic or aromatic monocarboxylic acids. Examples of suitable acids are formic, acetic, propionic, butyric and benzoic acids. The di-ester of acetic acid is especially suitable. The esters are new compounds and may be obtained by esterifying acetaldolcyanohydrin using the appropriate acid chloride or acid anhydride.

The heat treatment of the esters is conveniently effected in a tube or other container through which gases or vapours may be passed, and which may be of glass or other suitable material, and which may be empty or packed with glass, earthenware or other suitable contact material. The ester may be vapourised either in the tube or before entering it, and the vapour may be diluted with nitrogen gas or benzene vapour, or other inert gas or vapour. The best temperature for the process depends upon the particular ester, and also upon the contact time of the gas or vapour at the temperature in question. In general we have found that temperatures between 350° and 600° C. are satisfactory, and that temperatures between 450 and 550° C. are the most suitable.

The following examples, in which parts are by weight, illustrate but do not limit the invention.

Example 1

The pyrolysis is effected in vertical borosilicate glass tubes, each tube being 1 metre long, 5 cm. internal diameter, and packed for a length of 80 cm. with stainless steel Lessing rings. The tubes are maintained at a temperature of 480-500° C. Acetaldolcyanohydrin diacetate is fed by gravity at a rate of about 300 g. per hour to each tube, and the vapours which issue from the tubes are condensed. The condensate is washed free from acid with aqueous sodium carbonate solution and the oil which separates is fractionally distilled in vacuo. A good yield of 1-cyanobutadiene-1:3, B. P. 48–50°/24 mm., is obtained.

Acetaldolcyanohydrin diacetate is made by running 88 parts of acetaldol into 34 parts of anhydrous hydrocyanic acid containing 1 part of diethylamine as catalyst, while stirring, and cooling to keep the temperature at 20–25° C. When the addition is complete, 1 part of sulphuric acid in 10 parts of acetic anhydride is added and the mixture is blown over into 225 parts of boiling acetic anhydride containing 0.2 part of sulphuric acid at such a rate as to keep the mixture gently boiling. On direct fractionation in vacuo, the resulting liquid gives 155 parts of acetaldolcyanohydrin diacetate, B. P. 150° C./22 mm.

Example 2

The tubes used were of the same dimensions as those described in Example 1, and were filled with unglazed earthenware beads. A solution of acetaldolcyanohydrin diacetate in twice its weight of benzene was fed by gravity into the tubes at a rate of 500 gm. per hour per tube, the temperature of the tubes being maintained at 480–500° C., during the passage. The issuing vapours were condensed and washed free from acetic acid with aqueous sodium carbonate solution. On fractional distillation in vacuo a good yield of 1-cyanobutadiene-1,3 was obtained.

Example 3

Acetaldolcyanohydrin dibenzoate (boiling at 200–220° C./5 mm., and prepared by the action of benzoyl chloride on acetaldolcyanohydrin in the presence of pyridine) was dissolved in twice its weight of benzene and fed by gravity at a rate of 400 gm. per hour into tubes of the same dimension and packing as those of Example 1. The tubes were maintained at a temperature of 480–500° C. The issuing vapours were condensed and the condensate worked up as before to give 1-cyanobutadiene-1,3.

Example 4

Acetaldolcyanohydrin dipropionate (boiling at 170–180° C./2 mm., and prepared by the action of propionyl chloride on acetaldolcyanohydrin in the presence of pyridine) was dissolved in twice its weight of benzene and fed by gravity at a rate of 350 gm. of the mixture per hour into tubes of the same dimensions and filling as those described in Example 1. The temperature was maintained at 470–490° C. during the passage. On working up the issuing vapours in the same way as in Example 1, a good yield of 1-cyanobutadiene-1,3 was obtained.

1-cyanobutadiene-1,3 can be polymerised to give a rubber-like material.

As many apparently widely different embodiments of this invention may be made without departing from the spirit and scope thereof, it is to be understood that the invention is not limited to the specific embodiments thereof except as defined in the appended claims.

We claim:

1. Process for the manufacture of 1-cyanobutadiene-1,3 which comprises reacting acetaldol with anhydrous hydrocyanic acid, acylating the resulting acetaldolcyanohydrin, and pyrolyzing, in the vapor phase, the resulting di-ester of acetaldolcyanohydrin at decomposition temperature.

2. Process for the manufacture of 1-cyanobutadiene-1,3 which comprises reacting acetaldol with anhydrous hydrocyanic acid, reacting the resulting acetaldolcyanohydrin with acetic anhydride, and pyrolyzing, in the vapor phase, the resulting di-ester of acetaldolcyanohydrin at decomposition temperature.

3. Process for the manufacture of 1-cyanobutadiene-1,3 which comprises acylating acetaldolcyanohydrin, and pyrolyzing, in the vapor phase, the resulting di-ester of acetaldolcyanohydrin at decomposition temperature.

4. Process for the manufacture of 1-cyanobutadiene-1,3 which comprises reacting acetaldolcyanohydrin with an acetic anhydride, and pyrolyzing, in the vapor phase, the resulting di-ester of acetaldolcyanohydrin at decomposition temperature.

5. Process for the manufacture of 1-cyanobutadiene-1,3 which comprises pyrolyzing, in the vapor phase, a di-ester of acetaldolcyanohydrin at decomposition temperature.

6. Process for the manufacture of 1-cyanobutadiene-1,3 which comprises pyrolyzing, in the vapor phase, a di-ester of acetaldolcyanohydrin at a temperature between 350° C. and 600° C.

7. Process for the manufacture of 1-cyanobutadiene-1,3 which comprises pyrolyzing, in the vapor phase, a di-ester of acetaldolcyanohydrin at a temperature between 450° C. and 550° C.

8. Process for the manufacture of 1-cyanobutadiene-1,3 which comprises pyrolyzing, in the vapor phase, acetaldolcyanohydrin diacetate at decomposition temperature.

9. Process for the manufacture of 1-cyanobutadiene-1,3 which comprises pyrolyzing, in the vapor phase, acetaldolcyanohydrin diacetate at a temperature between 350° C. and 600° C.

10. Process for the manufacture of 1-cyanobutadiene-1,3 which comprises pyrolyzing, in the vapor phase, acetaldolcyanohydrin diacetate at a temperature between 450° C. and 550° C.

HERBERT GUDGEON.
ROWLAND HILL.